Figure 1:
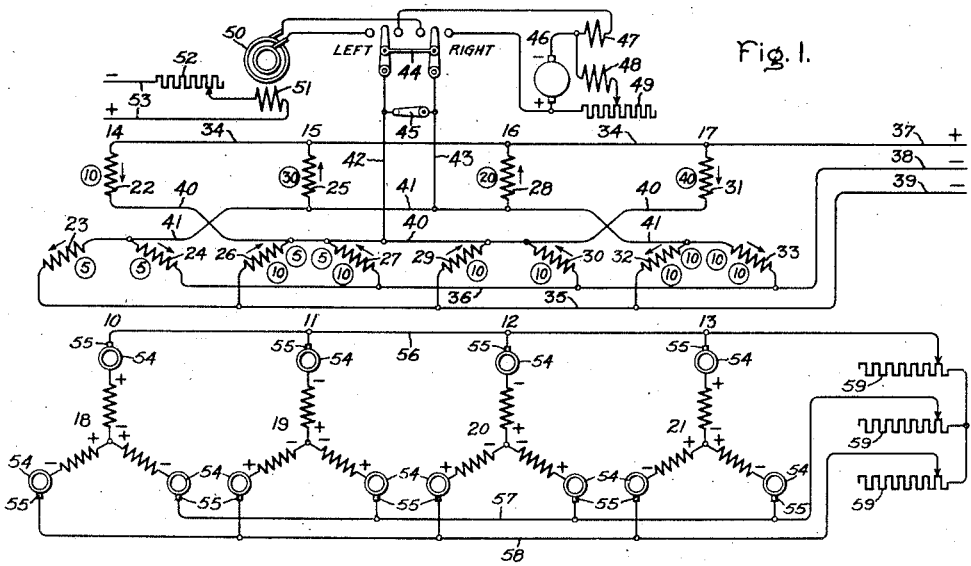

June 14, 1932.  J. I. HULL  1,863,408

SPEED CONTROL

Filed Aug. 28, 1930

Inventor:
John I. Hull.
by Charles E. Tullar
His Attorney.

Patented June 14, 1932

1,863,408

UNITED STATES PATENT OFFICE

JOHN I. HULL, OF SCHENECTADY, NEW YORK, ASSIGNOR TO GENERAL ELECTRIC COMPANY, A CORPORATION OF NEW YORK

SPEED CONTROL

Application filed August 28, 1930. Serial No. 478,469.

My invention relates to the speed control of electric motors and its principal object is to provide a method of operating a group of synchronized alternating current motors to obtain stable creeping speeds and to provide simple and reliable means for controlling the speed torque characteristics of electric motors so that a group of synchronized induction motors will have stable speed characteristics when operated at creeping speeds materially below their normal speeds.

The various sections of large printing machines are driven in synchronism, that is, a fixed relation between the speeds of the various sections is maintained, and therefore the various sections are usually driven by separate induction motors having their secondary windings connected in parallel with each other so as to form a group of synchronized induction motors with a fixed relation between the speeds of the various motors, thus satisfying the normal speed requirements of the printing machines. To adjust the rolls, type, etc., of the printing machines, it is necessary to operate them at creeping speeds materially below their normal speeds, and while these machines do not ordinarily require any exact creeping speed they do require a stabilized creeping speed so that moderate changes in the torque required to drive the machines do not produce large variations in the creeping speeds, these changes in the torque being caused by changes in the condition of the machine and variations in the material handled by the machine. Creeping speeds on the induction motors can be obtained by inserting resistances in series with their secondary windings but this causes the motors to have series characteristics which results in unstable creeping speeds. Because of the simplicity and low initial cost of the resistances it becomes desirable to obtain creeping speeds on the induction motors by inserting resistances in series with their secondary windings and simultaneously cause the motor to have shunt characteristics so as to give stabilized creeping speeds.

This desirable result is produced by my invention which consists of a group of induction motors having stationary and rotatable members provided with primary and secondary windings. These windings are arranged so that for normal operating speeds I energize the primary windings to produce the normal magnetic flux in each motor, thus producing the normal motor torque in each motor. To obtain creeping speeds I insert resistances in series with the secondary windings and simultaneously superimpose an additional magnetic flux on the normal magnetic flux of at least one of the motors so as to simultaneously produce motor and generator torques in the rotatable members of the motors. The difference between the motor and generator torques will be the effective torques of the motors and the motors will have creeping speeds with shunt characteristics.

My invention will be best understood from the following description when considered in connection with the accompanying drawing while the features of my invention which are believed to be novel and patentable are pointed out in the appended claims.

Figure 3:
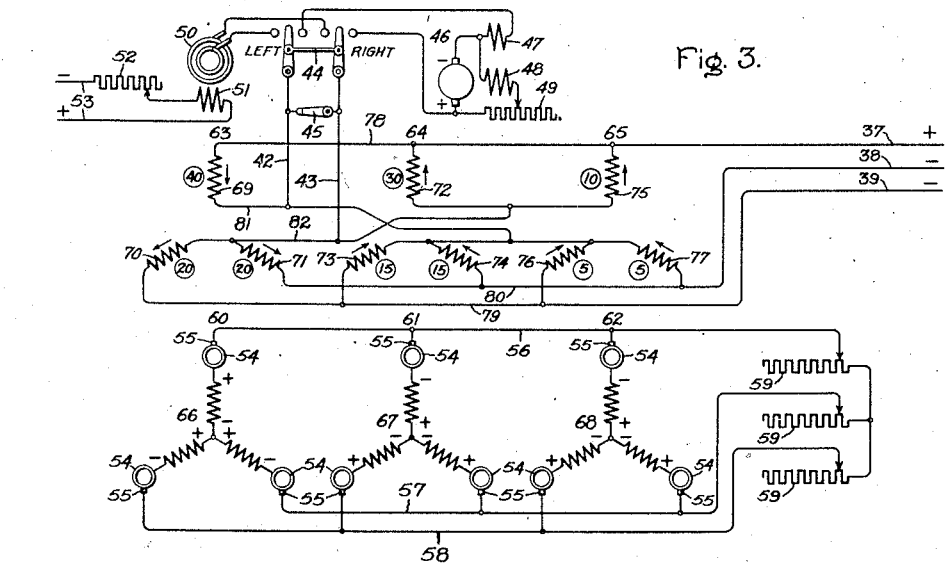
Figure 2:
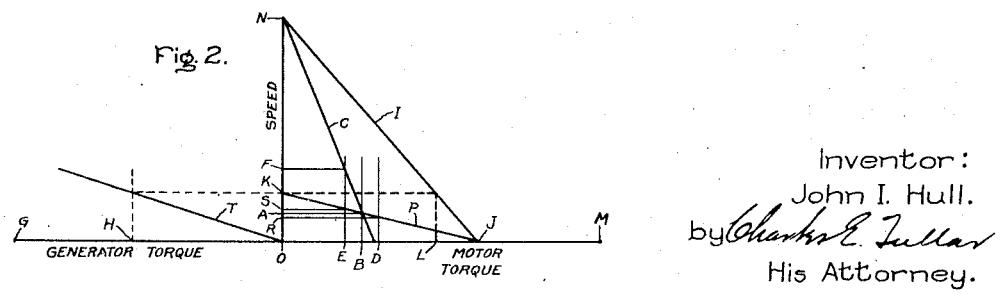

Fig. 1 represents a preferred embodiment of my invention as applied to a synchronized group of four induction motors which carry such loads that the sum of the currents in the primary windings of two motors is approximately equal to the sum of the currents in the primary windings of the other two motors. In Fig. 1, I represent the primary windings arranged so that I can energize them from the normal source of alternating current and simultaneously circulate through them additional currents obtained from a direct current generator or a low frequency alternating current generator, these additional currents creating an additional magnetic flux which produces a generator torque in the secondary windings. Fig. 2 represents speed torque curves useful in explaining my invention. A modification of Fig. 1 is shown in Fig. 3 which represents my invention as applied to a synchronized group of three induction motors which carry such loads that the current in the primary winding of one motor is approximately equal to the sum of the currents in the primary windings of the other two motors and in Fig. 3 the primary windings are arranged similar to those of Fig. 1.

In Fig. 1 the four, three-phase induction motors are represented by 10, 11, 12, and 13, these motors having stationary primary windings 14, 15, 16 and 17 respectively and rotatable three phase secondary windings 18, 19, 20, and 21 respectively. The primary winding 14 consists of three independent phase windings 22, 23, and 24; the primary winding 15 consists of three independent phase windings 25, 26, and 27; the primary winding 16 consists of three independent phase windings 28, 29, and 30; the primary winding 17 consists of three independent phase windings 31, 32, and 33, and both ends of each phase winding in the primary windings are brought out for external connections. One end of each of the phase windings 22, 25, 28, and 31 is connected to the lead 34, one end of each of the phase windings 23, 26, 29, and 32 is connected to the lead 35, one end of each of the phase windings 24, 27, 30, and 33 is connected to the lead 36, and the leads 34, 35 and 36 are connected to the three-phase alternating current lines 37, 38, and 39 which are the normal source of power for the motors 10, 11, 12, and 13. The other ends of the phase windings 22, 26, 27, 29, 30, and 31 are interconnected by the lead 40 and the other ends of the phase windings 23, 24, 25, 28, 32, and 33 are interconnected by the lead 41. The leads 42 and 43 are connected to the leads 40 and 41 and to the switch 44. The switch 45 is connected across the leads 42 and 43. If the switch 44 is closed to the right the leads 42 and 43 will be connected to the direct current generator 46 which is preferably provided with a compensating winding 47 and a self-excited field winding 48 in series with an adjustable resistance 49. If the switch 44 is closed to the left the leads 42 and 43 will be connected to the low frequency alternating current generator 50 having a separately excited field winding 51 connected in series with the adjustable resistance 52 to a source of direct current 53. Each of the three phase secondary windings 18, 19, 20, and 21 is preferably connected internally in Y and the secondary windings are connected in parallel with each other through the collector rings 54, brushes 55, and leads 56, 57 and 58, these leads being connected to the adjustable resistances 59, thus putting each secondary winding in series with the resistances 59. It is apparent that every primary winding could have two phase winding ends connected internally in the motor but it is preferable to bring all the phase winding ends out separately so that proper connection between the phase windings may be easily made when the motors are installed.

I will assume the instantaneous condition when the polarities of the lines 37, 38 and 39 are as shown by the polarity marks adjacent those lines and the voltage relations between those lines are such that the currents in one primary phase winding of each motor is equal to the sum of the currents in the other two primary phase windings of that motor. To give a definite example I will assume that the current in 22 is equal to the sum of the currents in 23 and 24, the current in 25 is equal to the sum of the currents in 26 and 27, the current in 28 is equal to the sum of the currents in 29 and 30, the current in 31 is equal to the sum of the currents in 32 and 33, and the motor loads are such that the currents in the phase windings 22, 25, 28 and 31 flowing from line 37 are represented by the numbers within the circles adjacent those phase windings. (The arrows adjacent to the phase windings show the relative directions of the direct or low frequency alternating currents in the phase windings.) At the instant assumed the phase windings 23 and 24 each require 5 amperes and the phase winding 25 will supply 10 amperes through lead 41, this current dividing equally between 23 and 24 as shown by the numbers 5 within the circles adjacent the phase windings 23 and 24. The phase windings 26 and 27 each require 15 amperes and the 10 amperes from phase winding 22 will flow through lead 40 and divide equally between 26 and 27 as shown by the numbers 5 within the circles adjacent the phase windings 26 and 27, and the phase winding 31 will supply 20 amperes through the lead 40, this current dividing equally between 26 and 27 as shown by the numbers 10 within the circles adjacent the phase windings 26 and 27. The phase windings 29 and 30 each require 10 amperes and the phase winding 31 will supply its remaining 20 amperes through lead 40, this current dividing equally between 29 and 30 as shown by the numbers 10 within the circles adjacent the phase windings 29 and 30. The phase windings 32 and 33 each require 20 amperes and the 20 amperes from phase winding 28 will flow through lead 41, this current dividing equally between 32 and 33 as shown by the numbers 10 within the circles adjacent the phase windings 32 and 33, and the phase winding 25 will supply its remaining 20 amperes through lead 41, this current dividing equally between 32 and 33, as shown by the second set of the numbers 10 within the circles adjacent to the phase windings 32 and 33. It is seen that there is no current flow through the leads 42 and 43 and the switch 45 when the sum of the currents in phase windings 22 and 31 equals the sum of the currents in phase windings 25 and 28. If now the load on the motor 10 increases so that at the instant assumed the current in its phase winding 22 increases to 30 amperes then the phase windings 23 and 24 will require 15 amperes each. The increase of 10 amperes required by the phase windings 23 and 24 will be supplied by the 20 amperes increased flow in phase winding 22, these 20 amperes flowing through leads 40 and 42, switch 45, leads 43 and 41, then dividing equally between phase windings 23 and 24. It is seen that the current flowing through leads 42 and 43 and switch 45 is the difference between the sum of the currents in phase windings 22 and 31 and the sum of the currents in phase windings 25 and 28. It is seen that irrespective of the loads on the motors 10, 11, 12 and 13 the currents in the three-phase circuits of the primary winding of each motor will correspond to the load on the particular motor and the motors will operate as if the three-phase circuits of each primary winding were directly connected in Y. Assume that corresponding phase ends of the secondary windings 18, 19, 20, and 21 are connected to each other and it will be obvious to those skilled in the art that the motors will operate as a group of synchronized induction motors, namely, that irrespective of the relative loads on the motors and the actual speeds of the motors there will always be a fixed relation between the speeds of the motors and as each motor drives a section of the printing machine there will be a fixed relation between the speeds of the various sections. During normal operation of the printing machine the resistances 59 are entirely cut out and the motors run at their normal speeds with shunt characteristics and there will be stable operation of the printing machine.

Creeping speeds on the induction motors are obtained by inserting a sufficient amount of the resistances 59 in series with the group of secondary windings and it is obvious that the fixed relation between the speeds of the motors will be maintained but the motors will have series characteristics. To simplify the explanation of the invention I do not represent any actual values of speed and torque in Fig. 2 and I assume that the motors have similar speed torque characteristics so that it is satisfactory to represent the speed torque curves of every motor by a single line in Fig. 2. Thus, if the creeping speed desired is represented by A in Fig. 2 and a torque represented by B is required to rotate the machines at the speed A, the resistances 59, Fig. 1, are adjusted so that the motors will have a speed torque curve represented by C as this gives the speed A at the torque B. In Fig. 2, OM represents motor torque, OG represents generator torque, N represents synchronous speed, and O represents zero speed. If the motors operate with the speed torque curve C and a change in the condition of the machine or a variation in the material handled occurs so that the torque required to drive the machine increases from B to D, the motors will be unable to rotate the sections of the machine and they will come to a standstill, and if the change in the condition of the machine or variation in the material is such that the torque required to drive the machines decreases from B to E the motor speeds will increase from A to F and the machines will run considerably above the permissible creeping speeds. It is seen that the series characteristics of the motors due to the use of the resistances 59 result in unstable creeping speeds.

I convert the series characteristics of the motors into shunt characteristics by simultaneously circulating direct current from the generator 46 and alternating current from the lines 37, 38 and 39 through the primary windings. The switch 44 is closed to the right and the switch 45 is opened. From the explanation previously given it should be clear that the motors will operate as if their primary windings were connected directly in Y and alternating current will flow through the generator 46 only to the extent of the difference between the sum of the currents in the phase windings 22 and 31 and the sum of the currents in the phase windings 25 and 28. The flow of alternating current through 46 does no material harm because the compensating winding 47 neutralizes the armature reaction, thus retaining substantially normal commutation on 46. Simultaneously with the flow of alternating current through the primary windings there will be direct current from 46 flowing through the primary windings in six parallel paths. Assuming the polarity of 46 to be as shown, one path is from lead 43, through lead 41, phase windings 25 and 22 in the directions shown by their adjacent arrows, through lead 40 to lead 42; a second path is from lead 43 through lead 41, phase windings 23 and 26 in the directions shown by their adjacent arrows, through lead 40 to lead 42 and a third path is from lead 43 through lead 41, phase windings 24 and 27 in the directions shown by their adjacent arrows, through lead 40 to lead 42. In a similar manner three parallel paths can be traced in the primary windings 16 and 17 with the directions of the flow of direct currents in their phase windings as shown by their adjacent arrows. The direct currents produce in each primary winding a stationary magnetic flux which is superimposed on the normal alternating current magnetic flux of normal frequency produced in each primary winding by the currents from the lines 37, 38 and 39. In addition to the normal voltages induced in each secondary winding by the normal flux of the primary windings there are additional voltages generated in each secondary winding due to its rotation in the stationary flux of the primary windings. All the arrows adjacent the phase windings of the primary winding 14 point downward and the relative polarities of the additional voltages generated in the phase windings of the secondary winding 18 will be as shown by the polarity marks adjacent the ends of the phase windings of 18, the actual instantaneous polarities being assumed as shown for the purpose of assisting the explanation of the invention. All the arrows adjacent the phase windings of the primary winding 15 point upward, thus producing direct current flux with relatively opposite magnetic polarity to the polarity of the direct current flux in 14. The relative polarities of the additional voltages generated in the phase windings of the secondary winding 19 will be as shown by the polarity marks adjacent the ends of the phase windings of 19, with the polarity at each end of every phase winding in the winding 19 opposite to the polarity at the corresponding end of the corresponding phase winding of the winding 18. The same relation exists between the polarities of the additional voltages generated in the phase windings of the windings 20 and 21 as shown by the polarity marks adjacent the ends of each phase winding. It is seen that there are two + polarity marks and two − polarity marks at the ends of the secondary windings connected to the lead 56 and the same is true with respect to the leads 57 and 58. Each secondary winding therefore acts as a generator whose external circuit consists of two other secondary windings connected in parallel and also acting as generators with the voltage of each secondary winding additively related to the voltage of each of the two secondary windings. Thus, the secondary winding 18 acts as a generator whose external circuit consists of the secondary windings 19 and 20 in parallel with 19 and 20 also acting as generators and the voltage of 18 is additively related to the voltage of 19 and to the voltage of 20. It is obvious that there will be a substantial flow of local circulating currents between the secondary windings, thus producing a generator torque in each secondary winding and these local circulating currents will not flow through the resistances 59.

The strength of the local circulating currents between the secondary windings depend on the speed of the secondary winding and the voltage of 46 as determined by the adjustment of the resistance 49. The local circulating currents are zero at zero speed of the secondary windings and increase with increasing speed of the secondary windings for a given setting of 49. Assume that the resistance 49 is adjusted so that the motors will have a generator speed torque curve represented by T in Fig. 2, and if the torque B is required to operate the printing machine at the desired creeping speed A, the resistances 59, Fig. 1, will be adjusted so that if there were no generator torques the motors would have a motor speed torque curve represented by I in Fig. 2. The generator torques oppose the motor torques and the difference between the two torques is the effective torques of the motors. At zero speed of the motors as represented by O, there is no generator torque and the motors have motor torques represented by OJ, whereas at the speed K the generator torques represented by OH equal the motor torques represented by OL and the motors have zero torque. The resulting speed torque curves of the motors are now represented by P and at the torque B the motors have the speed A, and if the necessary driving torque is increased to D the speeds of the motors decrease to R, and if the necessary driving torque decreases to E the speeds of the motors increase to S. The speed variation from R to S is much less than from O to F and the motors have shunt speed characteristics at the creeping speeds and stable operation of the printing machine is obtained.

In some cases it may be desirable to produce the generator torques in the secondary windings 18, 19, 20, and 21, Fig. 1, by circulating a very low frequency alternating current through the primary windings 14, 15, 16, and 17 simultaneously with the flow of the normal frequency currents from the lines 37, 38 and 39 through the primary windings. Assuming that the frequency of the lines 37, 38 and 39 is 60 cycles and the frequency of the generator 50 is 3 cycles, it can be seen that the current from the lines 37, 38 and 39 will produce in each motor its normal magnetic flux having 60 cycles frequency and the currents from the generator 50 will superimpose on the normal magnetic flux of each motor an additional magnetic flux having 3 cycle frequency. The relative direction of the flow of the low frequency currents through the primary windings may be represented by the arrows adjacent the phase windings of the primary windings. It is obvious that when the secondary windings rotate at a speed corresponding to the synchronous speed of 3 cycles there will be no voltage generated in the secondary windings by the 3 cycle flux and thus no generator torques will be produced. When the secondary windings rotate at a higher speed than that corresponding to the synchronous speed of 3 cycles, there will be voltages generated in the secondary windings by the 3 cycle flux and the relative polarities of these voltages will be as shown by the polarity marks adjacent the secondary windings, thus producing generator torques in the secondary winding. If the resistances 52 and 59 are suitably adjusted the motors will have stabilized creeping speeds. If the frequency of the generator 50 is varied, the speed at which the zero value of the generator torque curve T, Fig. 2 occurs will be varied, thus giving an additional flexibility to the control system.

Fig. 3 represents my invention applied to three motors with the load current on one motor equalling the sum of the load currents on the other two motors.

In Fig. 3 similar parts to those in Fig. 1 are represented by the same numbers. In Fig. 3, the three, three-phase induction motors are represented by 60, 61 and 62, these motors having stationary primary windings 63, 64 and 65 respectively and rotatable three phase secondary windings 66, 67, and 68 respectively. The primary winding 63 has three independent phase windings 69, 70 and 71; the primary winding 64 has three independent phase windings 72, 73, and 74; the primary winding 65 has three independent phase windings 75, 76 and 77, and both ends of each phase winding in the primary windings are brought out for external connections. One end of each of the phase windings 69, 72 and 75 is connected to the lead 78, one end of each of the phase windings 70, 73, and 76 is connected to the lead 79, one end of each of the phase windings 71, 74 and 77 is connected to the lead 80 and the leads 78, 79, and 80 are connected to the lines 37, 38, and 39. The other ends of the phase windings 69, 73, 74, 76, and 77 are interconnected by the lead 81 and the other end of the phase windings 70, 71, 72, and 75 are interconnected by the lead 82.

I will assume the instantaneous condition when the polarities of the lines 37, 38 and 39 are as shown by their adjacent polarity marks and the voltage relations between those lines are such that the current in one phase winding of each motor is equal to the sum of the currents in the other two-phase windings of that motor. To give a definite example I will assume that the current in 69 is equal to the sum of the currents in 70 and 71, the current in 72 is equal to the sum of the currents in 73 and 74, the current in 75 is equal to the sum of the currents in 76 and 77, and the motor loads are such that the currents in the phase windings 69, 72 and 75 flowing from line 37 are represented by the numbers within the circles adjacent those phase windings. At the instant assumed the phase windings 70 and 71 each require 20 amperes and the currents from 72 and 75 unite and flow through lead 82 and divide equally between phase windings 70 and 71, each receiving 20 amperes as shown by the numbers 20 within the circles adjacent 70 and 71. The phase windings 73 and 74 each require 15 amperes, and 30 amperes from phase winding 69 will flow through lead 81 and divide equally between 73 and 74 as shown by the numbers 15 within the circles adjacent to 73 and 74, and the remaining 10 amperes of phase winding 69 also flows through lead 81 and divides equally between 76 and 77 as shown by the numbers 5 within the circles adjacent 76 and 77. It is seen that the currents in the phase windings of each primary winding correspond to the loads on the particular motor and the motors will operate as if the three-phase windings of each primary winding were directly connected in Y. From the example given in connection with Fig. 1 it should be clear that the motors will operate as normal induction motors irrespective of their loads and with the switch 44 open and the switch 45 closed during normal operation the current flowing through 45 will be the difference between the current in 69 and the sum of the currents in 72 and 75. During normal operation the resistances 59 are cut out, the motors operate at normal speeds with shunt characteristics and there is stable operation of the printing machine.

Creeping speeds on the induction motors are obtained by inserting a sufficient amount of the resistances 59 in series with the group of secondary windings but the motors now have series characteristics which results in unstable operation of the printing machine as explained in connection with Fig. 1. The series characteristics can be converted into shunt characteristics by circulating current from 46 or 50 through the primary windings simultaneously with the flow of current from lines 37, 38 and 39 through the primary windings. Thus, if the switch 45 is opened and the switch 44 is closed to the right, the motors will continue to operate as if their phase windings were connected directly in Y and direct current from 46 simultaneously flows through the primary windings in three parallel paths. Assuming the polarity of 46 to be as shown, one path is from lead 43 through lead 82, phase windings 72 and 75 in parallel in the directions shown by their adjacent arrows, lead 78, phase winding 69 in the direction shown by its adjacent arrow, and lead 81, to lead 42. A second path is from lead 43 through lead 82, phase winding 70 in the direction shown by its adjacent arrow, lead 79, phase windings 73 and 76 in parallel in the directions shown by their adjacent arrows and lead 81, to lead 42. A third path is from lead 43, through lead 82, phase winding 71 in the direction shown by its adjacent arrow, lead 80, phase windings 74 and 77 in parallel in the directions shown by their adjacent arrows and lead 81 to lead 42. The direct currents produce in each primary winding a stationary magnetic flux which is superimposed on the normal alternating current magnetic flux of normal frequency produced in each primary winding by the currents from the lines 37, 38 and 39. In addition to the normal voltages induced in each secondary winding by the normal flux of the primary windings there are additional voltages generated in each secondary winding due to its rotation in the stationary flux of the primary windings. The arrows adjacent the phase windings of the primary winding 63 point downward and the arrows adjacent the phase windings of the primary windings 64 and 65 point upward. From the explanation given in connection with Fig. 1, it should be clear that the relative and actual instantaneous polarities of the additional voltages generated in the secondary windings may be represented by the polarity marks adjacent the ends of the phase windings of the secondary windings. The secondary winding 66 acts as a generator whose external circuit consists of the secondary windings 67 and 68 in parallel, and with 67 and 68 also acting as generators, and the voltage of 66 is additively related to the voltage of 67 and to the voltage of 68. There will be a substantial flow of local currents between the secondary windings, thus producing a generator torque in each secondary winding, and if the resistances 49 and 59 are suitably adjusted the motors will have stabilized creeping speeds. It is obvious that stabilized creeping speeds can also be obtained by circulating low frequency currents from the generator 50 through the primary windings.

From the explanations given in connection with Figs. 1 and 3, it should be clear that any group of motors can be connected so as to obtain stable creeping speeds with the minimum flow of alternating current from the lines 37, 38 and 39 through the generator 46 or the generator 50.

I have described my invention in connection with three phase induction motors driving a sectionalized printing machine but it is obvious that my invention can be applied to other types of alternating current motors irrespective of their number of phases and when driving any type of sectionalized machine or group of separate machines requiring a fixed relation between the speeds of the sections or between the speeds of the separate machines.

In describing my invention I have shown how stabilized creeping speeds are obtained by circulating direct or low frequency alternating currents through each primary winding but it is obvious that stabilized creeping speeds may be obtained by circulating these currents through less than all of the primary windings. Stabilized creeping speeds may also be obtained by any other means that result in an additional magnetic flux being superimposed on the normal magnetic flux of at least one motor. Examples of such other means are the circulation of direct or low frequency alternating current through one or more secondary windings or through one or more separate exciting windings placed on either the stationary or rotatable members of one or more motors with the primary windings connected in parallel to the same source of power or the primary windings connected to two or more separate sources. It should be obvious that the embodiments I have represented are for the purpose of explaining the principles of my invention and I therefore wish it understood that all modifications within the true spirit and scope of my invention are intended to be included within the scope of the appended claims.

What I claim as new and desire to secure by Letters Patent of the United States, is:

1. In combination, a plurality of alternating current motors each having stationary and rotatable members, primary windings on one member of each motor, secondary windings on the other member of each motor, means for connecting the secondary windings into a group of parallel connected windings, means for energizing the primary windings with alternating current so as to produce in each motor its normal magnetic flux, thereby producing the normal motor torques in said rotatable members, and means for simultaneously superimposing on the normal magnetic flux of at least one of said motors an additional magnetic flux whose characteristic relatively to that of the normal magnetic flux is such as to result in a flow of local circulating currents between the secondary windings thereby producing generator torques in said rotatable members.

2. In combination, a plurality of alternating current motors each having relatively rotatable primary and secondary windings, means for connecting the secondary windings into a group of parallel connected windings, means for energizing the primary windings with alternating current so as to produce in each motor its normal magnetic flux having the normal frequency, and means for simultaneously superimposing an additional alternating current magnetic flux on the normal magnetic flux of at least one of said motors with the additional magnetic flux having a frequency lower than the frequency of the normal magnetic flux, thereby resulting in a flow of local circulating currents between the secondary windings.

3. In combination, a plurality of alternating current motors each having relatively rotatable primary and secondary windings, means for connecting the secondary windings into a group of parallel connected windings, means for energizing the primary windings with alternating current so as to produce in each motor its normal magnetic flux having the normal frequency, and means for simultaneously superimposing on the normal magnetic flux of each motor an additional alternating current magnetic flux having a frequency lower than the frequency of the normal magnetic flux, with at least two of the motors having additional magnetic fluxes of relatively opposite polarities, thereby resulting in a flow of local circulating currents between the secondary windings.

4. In combination, a source of alternating current, a plurality of alternating current motors each having relatively rotatable primary and secondary windings, means for connecting the primary windings into one group of parallel connected windings, means for connecting the secondary windings into another group of parallel connected windings, connecting means between the group of primary windings and the source of alternating current to produce in each motor its normal magnetic flux having the normal frequency, and means for simultaneously superimposing an additional alternating current magnetic flux on the normal magnetic flux of at least one of said motors with the additional magnetic flux having a frequency lower than the frequency of the normal magnetic flux thereby resulting in a flow of local circulating currents between the windings of one of said groups of parallel connected windings.

5. In combination, a source of alternating current, a plurality of alternating current motors each having relatively rotatable primary and secondary windings, means for connecting the primary windings into one group of parallel connected windings, means for connecting the secondary windings into another group of parallel connected windings, connecting means between the group of primary windings and the source of alternating current to produce in each motor its normal magnetic flux having the normal frequency, and means for simultaneously superimposing on the normal magnetic flux of each motor an additional alternating current magnetic flux having a frequency lower than the frequency of the normal magnetic flux with at least two of the motors having additional magnetic fluxes of relatively opposite polarities thereby resulting in a flow of local circulating currents between the windings of one of said groups of parallel connected windings.

6. In combination, a plurality of alternating current motors each having relatively rotatable primary and secondary windings, means for connecting the secondary windings into a group of parallel connected windings, means for energizing the primary windings with alternating current so as to produce in each motor its normal magnetic flux having the normal frequency, and means for simultaneously circulating direct current through the primary winding of at least one of said motors so as to superimpose a stationary magnetic flux on the normal magnetic flux of at least one of said motors, thereby resulting in a flow of local circulating currents between the secondary windings.

7. In combination, a plurality of alternating current motors each having relatively rotatable primary and secondary windings, means for connecting the secondary windings into a group of parallel connected windings, means for energizing the primary windings with alternating current so as to produce in each motor its normal magnetic flux having the normal frequency, and means for simultaneously circulating direct current through the primary winding of each motor so as to superimpose a stationary magnetic flux on the normal magnetic flux of each motor with at least two of the motors having stationary magnetic fluxes of relatively opposite polarities, thereby resulting in a flow of local circulating currents between the secondary windings.

8. In combination, a source of alternating current, a plurality of alternating current motors each having relatively rotatable primary and secondary windings, means for connecting the primary windings into one group of parallel connected windings, means for connecting the secondary windings into another group of parallel connected windings, connecting means between the group of primary windings and the source of alternating current to produce in each motor its normal magnetic flux having the normal frequency, and means for simultaneously circulating direct current through one of said relatively rotatable windings of at least one of said motors so as to superimpose a stationary magnetic flux on the normal magnetic flux of at least one of the motors, thereby resulting in a flow of local circulating currents between the windings of one of said groups of parallel connected windings.

9. In combination a source of alternating current, a plurality of alternating current motors each having relatively rotatable primary and secondary windings, means for connecting the primary windings into one group of parallel connected windings, means for connecting the secondary windings into another group of parallel connected windings, connecting means between the group of primary windings and the source of alternating current to produce in each motor its normal magnetic flux having the normal frequency, and means for simultaneously circulating direct current through one of said groups of parallel connected windings so as to superimpose a stationary magnetic flux on the normal magnetic flux of each motor with at least two of the motors having stationary magnetic fluxes of relatively opposite polarities, thereby resulting in a flow of local circulating currents between the windings of the other of said groups of parallel connected windings.

10. In combination, a source of alternating current, a plurality of alternating current motors each having relatively rotatable primary and secondary windings, means for connecting the primary windings into one group of parallel connected windings, means for connecting the secondary windings into another group of parallel connected windings, connecting means between the group of primary windings and the source of alternating current to cause the normal flow of currents in the primary windings, and means for simultaneously circulating additional alternating currents in relatively opposite directions through at least two windings of one group of parallel connected windings, the said additional alternating currents having a frequency lower than the frequency of said source, thereby resulting in a flow of local circulating currents between the windings of the other group of parallel connected windings.

11. In combination, a source of alternating current, a plurality of alternating current motors each having relatively rotatable primary and secondary windings, means for connecting the primary windings into one group of parallel connected windings, means for connecting the secondary windings into another group of parallel connected windings, connecting means between the group of primary windings and the source of alternating current to cause the normal flow of currents in the primary windings, and means for simultaneously circulating additional alternating currents through all the windings of one group of parallel connected windings, the additional alternating currents having a frequency lower than that of said source and a flow in relatively opposite directions through at least two of the windings, thereby resulting in a flow of local circulating currents between the windings of the other group of parallel connected windings.

12. In combination, a source of alternating current, a plurality of alternating current motors each having relatively rotatable primary and secondary windings, means for connecting the primary windings into one group of parallel connected windings, means for connecting the secondary windings into another group of parallel connected windings, connecting means between the group of primary windings and the source of alternating current to cause the normal flow of currents in the primary windings, and means for simultaneously circulating direct currents through all the windings of one group of parallel connected windings with the direct currents flowing in relatively opposite directions through at least two of the windings, thereby resulting in a flow of local circulating currents between the windings of the other group of parallel connected windings.

13. In combination, a source of alternating current, a plurality of alternating current motors each having relatively rotatable primary and secondary windings, means for connecting the primary windings into one group of parallel connected windings, means for connecting the secondary windings into another group of parallel connected windings, connecting means between the group of primary windings and the source of alternating current to cause the normal flow of currents in the primary windings, and means for simultaneously circulating direct current in relatively opposite directions through at least two windings of one group of parallel connected windings, thereby resulting in a flow of local circulating currents between the windings of the other group of parallel connected windings.

14. In combination, a source of alternating current, a generator delivering alternating current having a frequency lower than the frequency of said source, a plurality of polyphase alternating current motors each having relatively rotatable primary and secondary windings, each of said primary windings consisting of a plurality of independent phase windings, connecting means for interconnecting one end of corresponding phase windings, means for connecting the secondary windings into a group of parallel connected windings, means for connecting the above mentioned connecting means to the source of alternating current, and means for interconnecting the remaining ends of the primary windings with the generator so as to permit the normal flow of currents from said source through the primary windings and simultaneously circulate currents from said generator between the primary windings with the currents from said generator flowing in relatively opposite directions through at least two of the primary windings, thereby resulting in a flow of local circulating currents between the secondary windings.

15. In combination a source of alternating current, a direct current generator, a plurality of polyphase alternating current motors each having relatively rotatable primary and secondary windings, each of said primary windings consisting of a plurality of independent phase windings, connecting means for interconnecting one end of corresponding phase windings, means for connecting the secondary windings into a group of parallel connected windings, means for connecting the above mentioned connecting means to the source of alternating current, and means for interconnecting the remaining ends of the primary windings with the direct current generator so as to permit the normal flow of currents from said source of alternating current through the primary windings and simultaneously circulate direct currents between said primary windings with the direct currents flowing in relatively opposite directions through at least two of the primary windings, thereby resulting in a flow of local circulating currents between the secondary windings.

16. In combination, a source of alternating current, a direct current generator, a plurality of polyphase alternating current motors each having relatively rotatable primary and secondary windings, each of said primary windings consisting of a plurality of independent phase windings, connecting means for interconnecting one end of the corresponding phase windings, means for connecting the secondary windings into a group of parallel connected windings, means for connecting the above mentioned connecting means to the source of alternating current, means for connecting one terminal of said direct current generator with an end of one phase winding of at least one motor primary winding and with the ends of two phase windings of at least one other motor primary winding, and means for connecting the other terminal of said direct current generator to the remaining ends of said phase windings.

17. The method of obtaining stable synchronized creeping speeds from a group of asynchronous motors having their secondary windings connected in parallel with each other and having their primary windings connected to a source of alternating current to produce in each motor an alternating magnetic flux having the frequency of the source, said method including the steps of increasing the resistances of the secondary winding circuits and superimposing on the alternating magnetic flux of at least one motor an additional alternating magnetic flux having a frequency lower than the frequency of the normal magnetic flux.

18. The method of obtaining stable synchronized creeping speeds from a group of asynchronous motors having their secondary windings connected in parallel with each other and having their primary windings connected to a source of alternating current to produce in each motor an alternating magnetic flux having the frequency of the source, said method including the steps of increasing the resistances of the secondary winding circuits and superimposing on the alternating magnetic flux of at least one motor a stationary magnetic flux.

19. The method of obtaining stable synchronized creeping speeds from a group of asynchronous motors having their secondary windings connected in parallel with each other and having their primary windings connected to a source of alternating current to circulate in each primary winding its normal alternating current having the frequency of the source, said method including the steps of increasing the resistances of the secondary winding circuits, and circulating through each motor primary winding an additional alternating current whose frequency is lower than the frequency of the normal alternating current with the additional alternating current flowing in relatively opposite directions in the primary windings of at least two motors.

20. The method of obtaining stable synchronized creeping speeds from a group of asynchronous motors having their secondary windings connected in parallel with each other and having their primary windings connected to a source of alternating current to circulate in each primary winding an alternating current having the frequency of the source, said method including the steps of increasing the resistances of the secondary winding circuits, and circulating direct current through each motor primary winding with the direct current flowing in relatively opposite directions in the primary windings of at least two motors.

In witness whereof, I have hereunto set my hand this 27th day of August, 1930.

JOHN I. HULL.